United States Patent
Tellez (10) Patent No.: US 7,967,366 B1
(45) Date of Patent: Jun. 28, 2011

(54) SYSTEM AND METHOD FOR MITIGATING DAMAGE

(76) Inventor: Robert Tellez, Fort Worth, TX (US)

( * ) Notice: Subject to any disclaimer, the term of this patent is extended or adjusted under 35 U.S.C. 154(b) by 143 days.

(21) Appl. No.: 12/268,682

(22) Filed: Nov. 11, 2008

(51) Int. Cl.
*B60J 7/20* (2006.01)

(52) U.S. Cl. .................................. 296/136.02

(58) Field of Classification Search ............ 296/136.02; 280/728.1; 5/706, 709, 710, 740
See application file for complete search history.

(56) References Cited

U.S. PATENT DOCUMENTS

| | | | | |
|---|---|---|---|---|
| 1,912,231 A * | 5/1933 | Wandscheer | ................ | 150/166 |
| 1,918,423 A * | 7/1933 | Persinger | ................ | 160/24 |
| 1,999,171 A * | 4/1935 | Bryant | ................ | 150/166 |
| 2,688,513 A * | 9/1954 | Poirier | ................ | 296/98 |
| 3,021,894 A * | 2/1962 | La Due | ................ | 160/23.1 |
| 3,050,075 A * | 8/1962 | Kaplan et al. | ................ | 296/98 |
| 3,146,824 A * | 9/1964 | Veilleux | ................ | 160/23.1 |
| 3,183,033 A * | 5/1965 | Stulbach | ................ | 296/97.2 |
| 3,222,102 A * | 12/1965 | Lucas | ................ | 296/136.03 |
| 3,768,540 A * | 10/1973 | McSwain | ................ | 160/23.1 |
| 4,131,269 A * | 12/1978 | Brattrud | ................ | 296/95.1 |
| 4,174,134 A * | 11/1979 | Mathis | ................ | 296/136.03 |
| 4,432,581 A * | 2/1984 | Guma | ................ | 296/136.03 |
| 4,519,644 A * | 5/1985 | Song | ................ | 296/136.04 |
| 4,657,298 A * | 4/1987 | O | ................ | 296/136.03 |
| 4,718,711 A * | 1/1988 | Rabbit | ................ | 296/136.03 |
| 4,727,898 A * | 3/1988 | Guma | ................ | 135/87 |
| 4,848,823 A * | 7/1989 | Flohr et al. | ................ | 296/98 |
| 4,856,842 A * | 8/1989 | Ross et al. | ................ | 296/136.03 |
| 4,929,016 A * | 5/1990 | Kastanis | ................ | 296/136.03 |
| 4,958,881 A * | 9/1990 | Piros | ................ | 296/98 |
| 5,176,421 A * | 1/1993 | Fasiska | ................ | 296/136.03 |
| 5,364,155 A * | 11/1994 | Kuwahara et al. | ................ | 296/136.04 |
| 5,423,588 A * | 6/1995 | Eglinton | ................ | 296/98 |
| 5,433,499 A * | 7/1995 | Wu | ................ | 296/95.1 |
| 5,468,040 A * | 11/1995 | Peng Hsieh et al. | ................ | 296/97.4 |
| 5,597,196 A * | 1/1997 | Gibbs | ................ | 296/98 |
| 5,630,237 A * | 5/1997 | Ku | ................ | 5/420 |
| 5,758,921 A | 6/1998 | Hall | | |
| 5,762,393 A * | 6/1998 | Darmas, Sr. | ................ | 296/98 |
| 5,775,765 A * | 7/1998 | Kintz | ................ | 296/98 |
| 6,012,759 A * | 1/2000 | Adamek | ................ | 296/136.03 |

(Continued)

OTHER PUBLICATIONS

Copending U.S. Appl. No. 11/810,304, filed Jun. 5, 2007, titled "Multi-Layered Apparatus for Covering a Vehicle," which is a continuation-in-part of U.S. Appl. No. 10/138,395, filed May 3, 2002, now issued as U.S. Patent. No. 7,360,820, titled "Inflatable apparatus for covering a vehicle."

*Primary Examiner* — Kiran B. Patel
(74) *Attorney, Agent, or Firm* — James E. Walton; Richard G. Eldredge (57) ABSTRACT

Disclosed herein is a damage mitigation system. In some embodiments, for example, the damage mitigation system can be used for protecting a vehicle from hail damage. The damage mitigation system includes a housing for storing at least one pad. The pad can be pulled from the housing, inflated, and positioned over an object to be protected. In some embodiments, the damage mitigation system can include a self-inflating pad. In some embodiments, the damage mitigation system can include an inflatable pad that is not self-inflating. The damage mitigation system also includes a motor for retracting the pad back into the housing. The housing includes pinching rods for squeezing the air from the pad as the pad is retracted so that the pad can be stored in a non-inflated configuration.

4 Claims, 8 Drawing Sheets

U.S. PATENT DOCUMENTS

| | | | |
|---|---|---|---|
| 6,056,347 A * | 5/2000 | D'Adamo | 296/136.02 |
| 6,092,857 A * | 7/2000 | Rivas | 296/136.04 |
| 6,131,643 A * | 10/2000 | Cheng et al. | 160/370.22 |
| 6,158,805 A * | 12/2000 | Blaney | 297/184.11 |
| 6,220,648 B1 | 4/2001 | Daniel | |
| 6,276,381 B1 * | 8/2001 | O'Brien | 135/87 |
| 6,397,417 B1 * | 6/2002 | Switlik | 5/709 |
| 6,502,889 B2 | 1/2003 | Fukagawa | |
| 6,513,858 B1 * | 2/2003 | Li et al. | 296/98 |
| 6,662,849 B1 * | 12/2003 | Hsiung | 160/122 |
| 6,672,643 B1 * | 1/2004 | Brodskiy et al. | 296/98 |
| 6,682,123 B2 | 1/2004 | Burks et al. | |
| 6,964,446 B2 * | 11/2005 | Porter | 296/98 |
| 6,981,509 B2 * | 1/2006 | Sharapov | 135/88.11 |
| 7,137,661 B2 * | 11/2006 | Neuer et al. | 296/136.01 |
| 7,213,868 B1 * | 5/2007 | Tan et al. | 296/136.04 |
| 7,478,862 B2 * | 1/2009 | Wiegel et al. | 296/98 |
| 2004/0135393 A1 * | 7/2004 | Neuer et al. | 296/136.1 |

* cited by examiner

SYSTEM AND METHOD FOR MITIGATING DAMAGE

BACKGROUND OF THE INVENTION

1. Field of the Invention

The present application relates to damage mitigation systems. In particular, the present application relates to retractable damage mitigation systems.

2. Description of Related Art

Property, when subjected to a harsh environment, can be quickly damaged. Vehicles in particular are subjected to environments that can rise in temperature to over 120 degrees Fahrenheit, or environments that can experience temperatures dropping below −10 degrees Fahrenheit. When weather turns bad, a vehicle outdoors can have to endure flying debris, hail, rain, snow, and sleet. Indeed nothing may be more brutal to a vehicle than direct sun, or parking next to a vehicle with wide swinging doors. Add in insects, bird droppings, and pollution, and property has a poor chance of lasting as long as an owner would hope.

Four general categories of attempts at protecting property exist. Namely, tarpaulin covers, inflatable covers, rigid-material covers, and structural shelters.

Tarpaulin covers typically consist of material used for protecting exposed objects or areas. While tarpaulin covers can provide some protection against minor destructive elements, such as rain, they cannot protect property against stronger destructive elements, such as hail and swinging car doors. Storage can be an issue because the tarpaulin cover must be folded up and stored.

Inflatable covers typically consist of air-tight material that can be inflated to protect exposed objects or areas. While inflatable covers can provide some protection against stronger destructive elements, such as hail, they require time to inflate, and can be punctured leaving little or no protection for property against destructive elements. Storage can be an issue because the inflatable cover must be deflated, folded up, and stored.

Thick-material covers typically consist of material with enough thickness to provide substantial protection for exposed objects or areas, such as foam, Styrofoam, plastic, metal, or wood. While tarpaulin covers can provide good protection against stronger destructive elements, such as hail and swinging car doors, they are cumbersome and may require custom fitting. Storage is a major issue because of the thickness, and possibly the inflexibility, of the material. The thickness also hinders the mobility of thick-material covers.

Structural shelters typically consist of material erected around property for protection, such as sheds, car ports, and tents. While structural shelters provide excellent protection against stronger destructive elements, such as hail and flying debris, they are typically not mobile, or if they are, require laborious setup and teardown. Again, storage is a major issue because of size and the number of components.

Some covers incorporate a cover holder, which can house the cover for easy storage, and allow the cover to be pulled out and reeled back in. These cover holders do not provide protection-level options for the owner and typically can only house covers which can provide minor damage protection.

Although the aforementioned methods of protecting property represent great strides in the area of damage mitigation systems, many shortcomings remain.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE DRAWINGS

Figure 1:
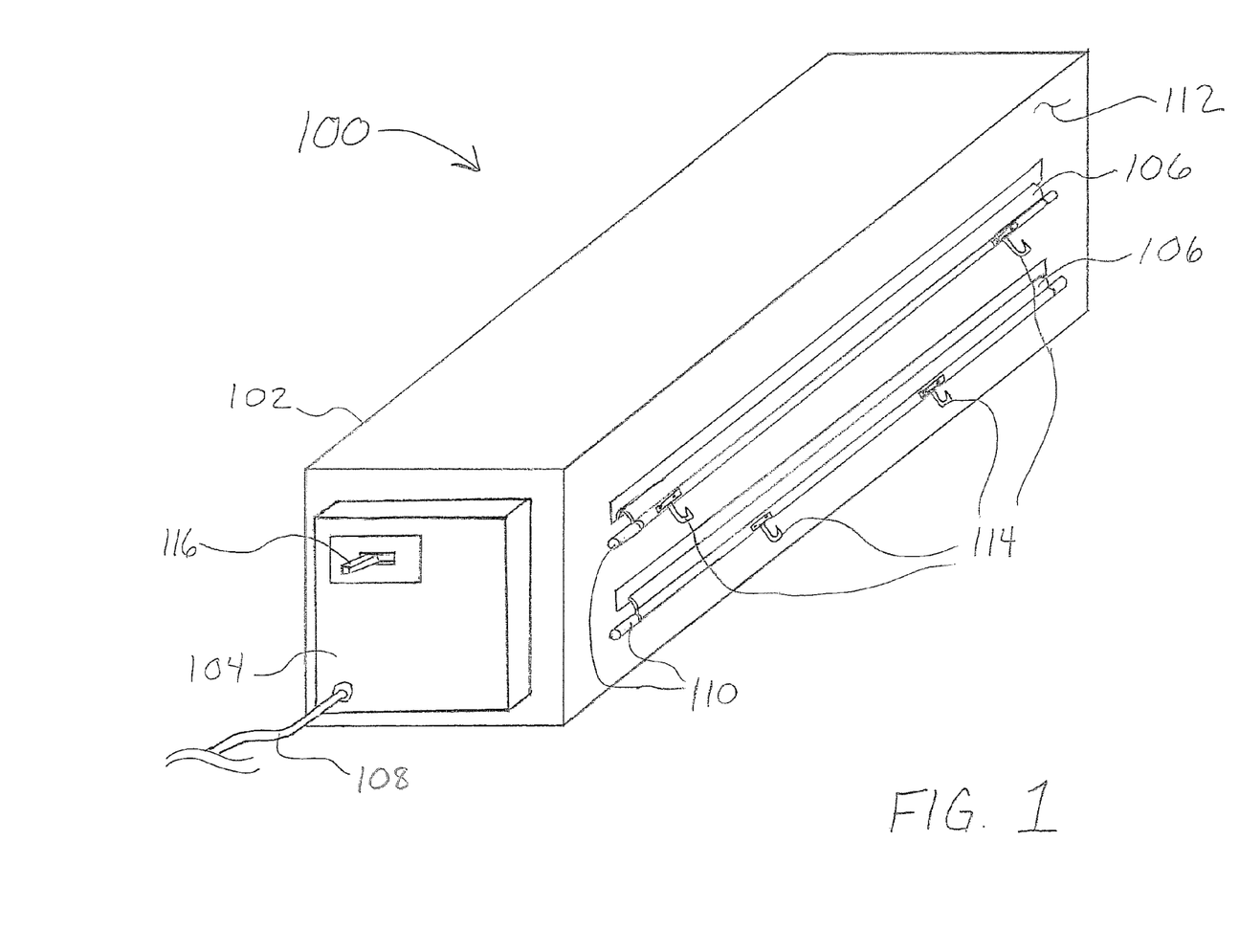
FIG. 1 is a perspective view of a retractable damage mitigation system.

Referring to FIG. 1, there is shown a perspective view of a retractable damage mitigation system 100 for a vehicle according to the present application. Damage Mitigation System (DMS) 100 includes housing 102, motor housing 104, tab material 106, cable 108, bar 110, hooks 114, and switch 116.

Housing 102 can be made of metal, plastic, wood, or any rigid material. Housing 102 provides storage for at least one self-inflating foam pad (not shown) and internal components necessary to provide functionality for DMS 100. Alternatively, housing 102 can provide storage for at least one inflatable pad, cover, or material. Motor housing 104 is detachably coupled to housing 102 to allow access to components disposed within housing 102, such as a motor (not shown). Motor housing 104 can be made of metal, plastic, wood, or any rigid material.

Switch 116 protrudes through motor housing 104 and is operably coupled to a motor (not shown) disposed within motor housing 104. Switch 116 is adapted to control the motor, such as turning the motor on and off, and setting the motor speed. In some embodiments, the motor can be controlled remotely through the use of a wired or wireless remote control unit (not shown). Cable 108 runs through motor housing 104 and is operably coupled to the motor. Cable 108 can be adapted to provide AC or DC electrical power to DMS 100. Cable 108 can be operably coupled to a vehicle's battery, or terminate with an electrical outlet plug or a battery pack. Alternatively, cable 108 can be disposed within motor housing 104 and terminate with the battery pack, also disposed within motor housing 104.

Portal face 112 of housing 102 comprises at least one opening through which the pad can be deployed and retracted. The pad has tab material 106 disposed on both ends to allow for more flexibility and cutting, such as cutting a hole in the center of tab material 106 to allow a trunk latch to operate therethrough. Tab material 106 can be made of cotton, plastic, or any pliable material. Bar 110 is coupled to tab material 106 to assist a user in deploying the pads from housing 102. Bar 110 can be made of wood, metal, plastic, or any rigid material. Bar 110 is longer than the openings of portal face 112 of housing 102, so when the pad is retracted through the openings of portal face 112 of housing 102, bar 110 remains exterior to housing 102. Bar 110 has at least one hook 114 coupled to it. Hook 114 can be nailed, glued, screwed, or coupled by other suitable methods to bar 110 or tab material 106. Hook 114 retains the pad to an object in order to mitigate impact damage to the object. Hook 114 can be made of metal, plastic, wood, or other suitable material. Alternatively, hook 114 can swivel to provide more secure retention of the pad to the object.

In operation, DMS 100 is coupled to an object to prevent impact damage. A user would pull bar 110 away from housing 102, thereby manually deploying the pad. In some embodiments, the pad can be deployed by operation of the motor. The pad would be pulled over an object and secured with at least one hook 114. Alternatively, straps can be used to conform the pad to the contours of the object and provide stronger pad retention. The pad can be adapted to self-inflate in order to provide greater impact damage protection. After use, the pad can be retracted back into housing 102 by unhooking at least one hook 114 and operating the motor with switch 116 to retract the pad into housing 102 for storage.

Figure 2:
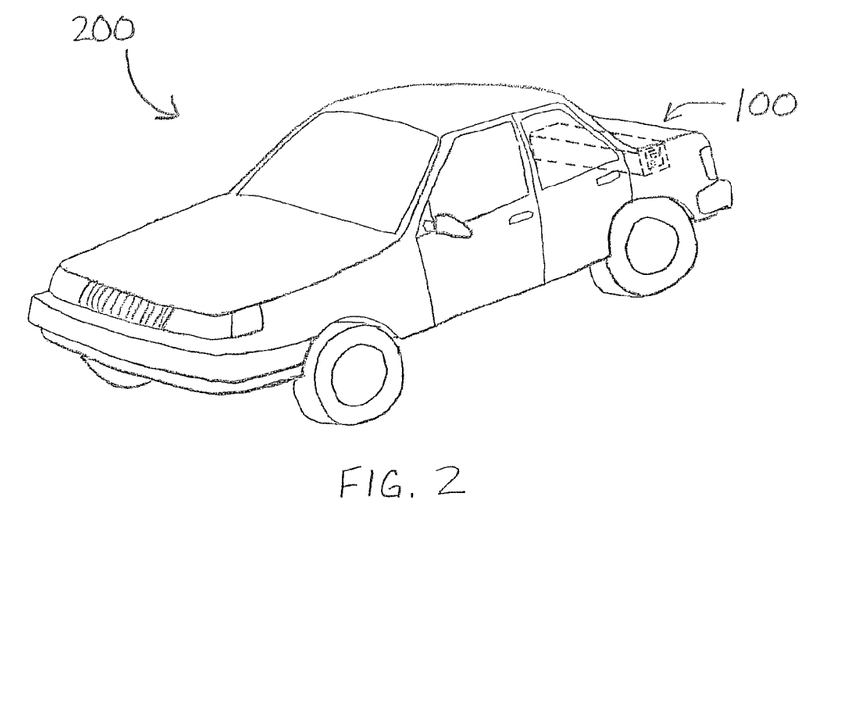
FIG. 2 is a perspective view of a vehicle having the retractable damage mitigation system of FIG. 1 disposed within the trunk.

Referring now also to FIG. 2 in the drawings, there is shown a perspective view of a vehicle 200 having the retractable DMS 100 disposed within the trunk. DMS 100 can be disposed within the trunk of vehicle 200 to allow easy access and deployment. At least one foam pad, which can be self-inflating in some embodiments and can be inflatable in other embodiments, can be deployed and pulled over the front of vehicle 200 to mitigate impact damage to vehicle 200. The pad can be deployed so that tab material 106 is secured by the trunk lid. A notch can be cut in tab material 106 so that the trunk latching mechanism can operate properly through the notch in the tab material 106. At least one hook 114 can be used to secure the pad to vehicle 200 by attaching hook 114 to any suitable location on the vehicle 200, for example to the bottom of the front bumper of vehicle 200. Alternatively, multiple pads can be used to cover various different parts of the vehicle 200. For example, a first pad can be pulled through the opening between the back of the trunk lid and the back edge of the trunk of vehicle 200, over the front of vehicle 200, and secured to the bottom of the front bumper of vehicle 200, and a second pad can be pulled through the opening between the back of the trunk lid and the back edge of the trunk of vehicle 200, over the rear of vehicle 200, and secured to the bottom of the rear bumper of vehicle 200. DMS 100 can be factory installed or retro-fitted to existing vehicles.

Figure 3:
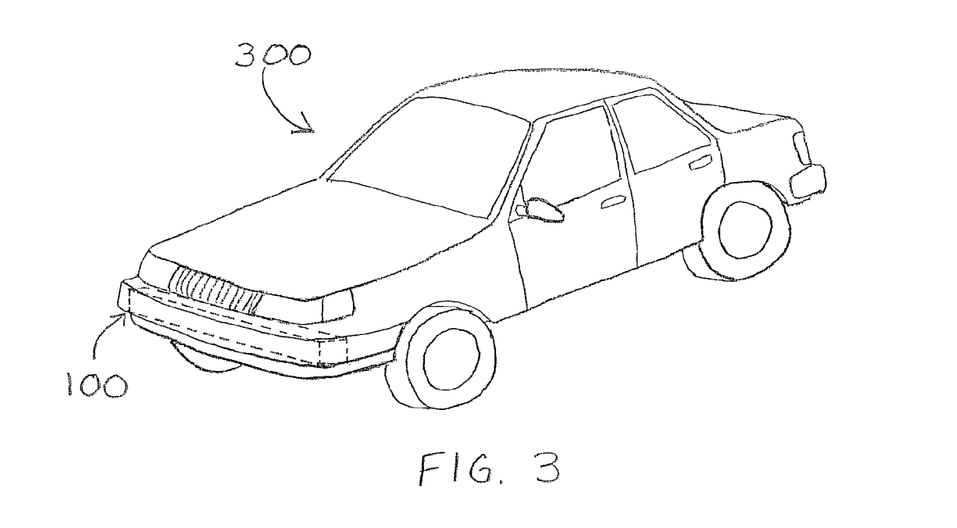
FIG. 3 is a perspective view of a vehicle having the retractable damage mitigation system of FIG. 1 disposed within the front bumper.

Referring now also to FIG. 3 in the drawings, there is shown a perspective view of a vehicle 300 having the retractable DMS 100 disposed within the front bumper. DMS 100 can be disposed within the front bumper of vehicle 300 to allow storage without reducing trunk space. At least one foam pad, which can be self-inflating in some embodiments and can be inflatable in other embodiments, can be deployed and pulled over at least a portion of the vehicle 300 to mitigate impact damage to vehicle 300. Alternatively, the pad can be deployed so that tab material 106 lies on the ground and vehicle 300 can be positioned on tab material 106 to secure the pad relative to vehicle 300. DMS 100 can be factory installed or retro-fitted to existing vehicles.

Figure 4:
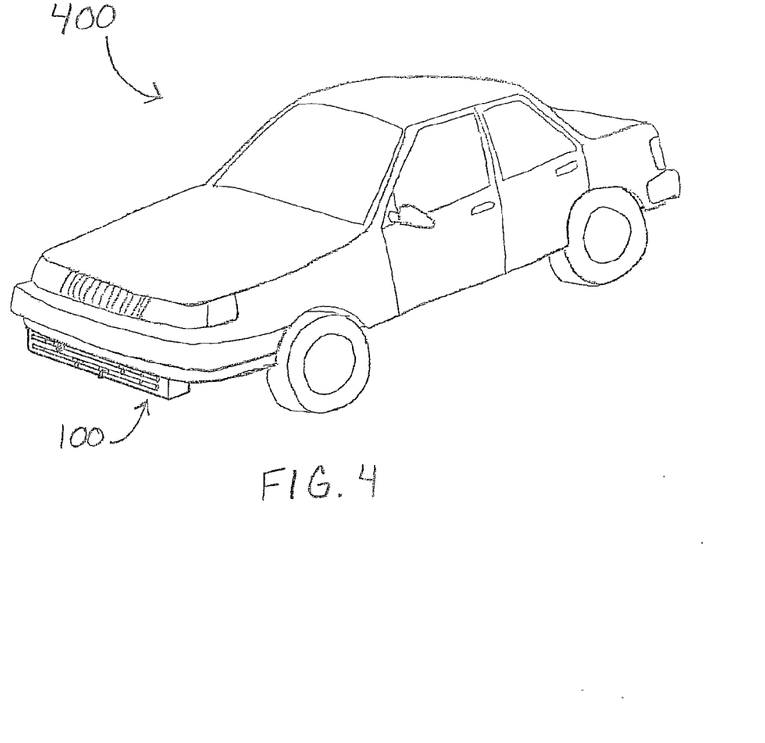
FIG. 4 is a perspective view of a vehicle having the retractable damage mitigation system of FIG. 1 disposed beneath the front bumper.

Referring now also to FIG. 4 in the drawings, there is shown a perspective view of a vehicle 400 having the retractable DMS 100 disposed beneath the front bumper. DMS 100 can be disposed beneath the front bumper of vehicle 400 to allow easy access and deployment without reducing trunk space. At least one foam pad, which can be self-inflating in some embodiments and can be inflatable in other embodiments, can be deployed and pulled over at least a portion of the vehicle 400 to mitigate impact damage to vehicle 400. Alternatively, the pad can be deployed so that tab material 106 lies on the ground and vehicle 400 can be positioned on tab material 106 to secure the pad relative to vehicle 400. DMS 100 can be factory installed or retro-fitted to existing vehicles.

Figure 5:
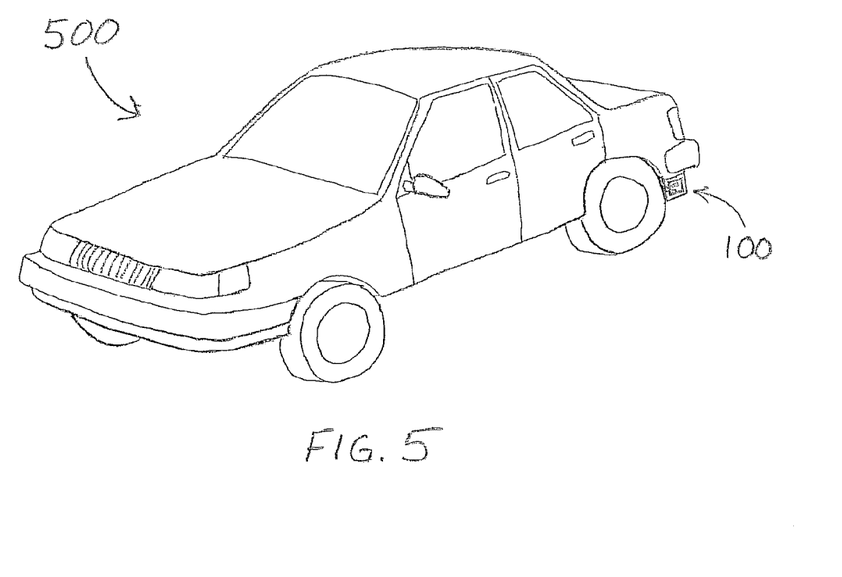
FIG. 5 is a perspective view of a vehicle having the retractable damage mitigation system of FIG. 1 disposed beneath the rear bumper.

Referring now also to FIG. 5 in the drawings, there is shown a perspective view of a vehicle 500 having the retractable DMS 100 disposed beneath the rear bumper. DMS 100 can be disposed beneath the rear bumper of vehicle 500 to allow easy access and deployment without reducing trunk space. At least one foam pad, which can be self-inflating in some embodiments and can be inflatable in other embodiments, can be deployed and pulled over at least a portion of vehicle 500 to mitigate impact damage to vehicle 500. Alternatively, the pad can be deployed so that tab material 106 lies on the ground and vehicle 500 can be positioned on tab material 106 to secure the pad relative to vehicle 500. DMS 100 can be factory installed or retro-fitted to existing vehicles.

Figure 6:
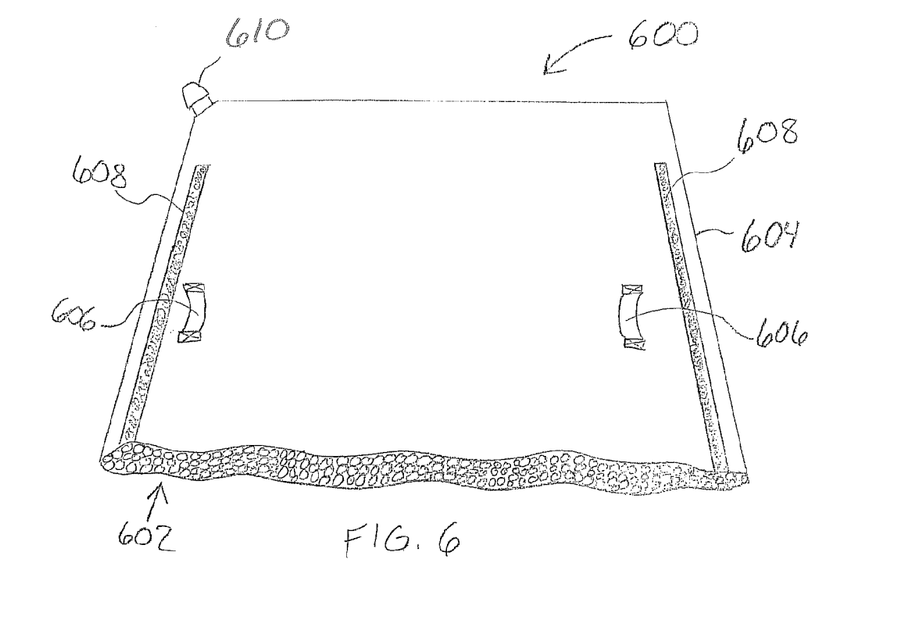
FIG. 6 is a cross-sectional view of a self-inflating foam pad.

Referring now also to FIG. 6 in the drawings, there is shown a cross-sectional view of a self-inflating foam pad 600 according to an embodiment of the present application. Self-inflating foam pad 600 can include self-inflating foam 602, shell material 604, belt loop 606, Velcro strip 608, and nozzle 610.

Shell material 604 is disposed around foam 602 to provide an air-tight seal. Shell material 604 can be made of plastic or other suitable material. Belt loop 606 is coupled to one side of shell material 604 to provide a guide for a strap (not shown). Belt loop 606 can be made of plastic or other suitable material and coupled to shell material 604 with electro-weld, adhesive, or other suitable method. Velcro strip 608 runs down the length of both sides of self-inflating foam pad 600 to provide a method of securing other pads (not shown) to self-inflating foam pad 600. Alternatively, quick-release fasteners, snaps, zippers, and other suitable fastening methods can be employed. Nozzle 610 is configured to be selectively opened for allowing air to enter and exit self-inflating foam pad 600. Nozzle 610 is configured to create an at least substantially air-tight seal when closed. Nozzle 610 can have a screwing mechanism, a corking mechanism, or other suitable mechanism to allow and restrict airflow in self-inflating foam pad 600. In some embodiments, the shell material 604 can be provided with a pop-off valve or the like to prevent over-inflation that would otherwise rupture the shell material 604.

In operation, self-inflating foam pad 600 is stored in a deflated state with nozzle 610 in a closed state. The self-inflating foam 602 is formed of a open-cell foam material that is stored in a compressed state with most of the air removed therefrom. When nozzle 610 is opened, the self-inflating foam 602 expands to its original shape, sucking air into shell material 604 so that the self-inflating foam 602 can expand, and thereby increase the thickness of self-inflating foam pad 600. Once self-inflating foam pad 600 has expanded to its maximum thickness, nozzle 610 can be closed to retain the air. To deflate self-inflating foam pad 600, nozzle 610 is opened and self-inflating foam pad 600 is compressed, for example by rolling up the pad, thereby expelling air from the self-inflating foam 602 through nozzle 610. Once the pad 600 is compressed, nozzle 610 is closed providing a vacuum seal for self-inflating foam pad 600.

Figure 7:
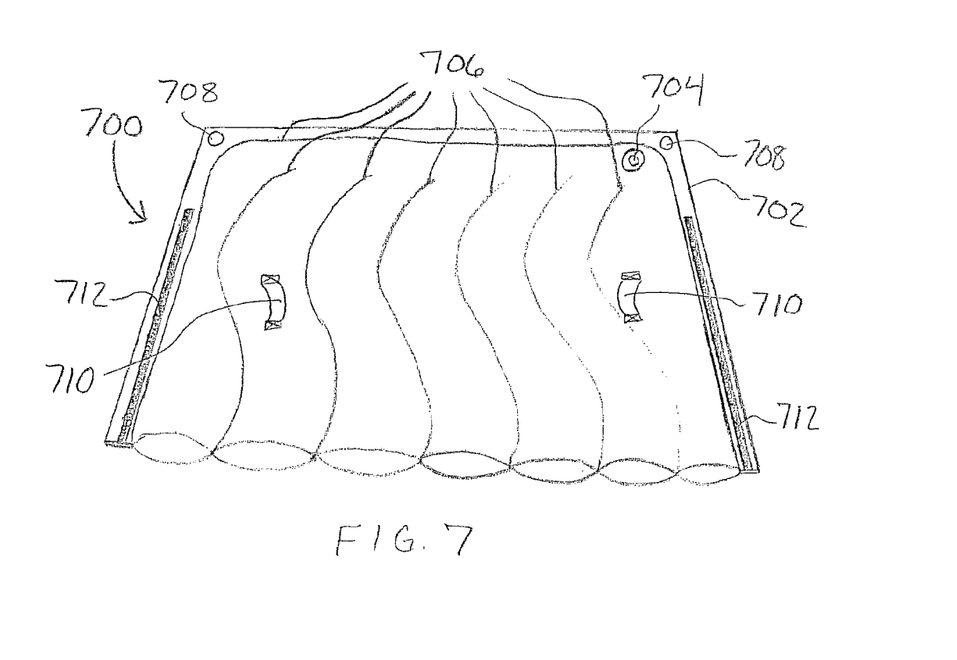
FIG. 7 is a cross-sectional view of an air-inflatable pad.

Referring now also to FIG. 7 in the drawings, there is shown a cross-sectional view of an inflatable pad 700 according to another embodiment of the present application. Inflatable pad 700 can include pad material 702, inflating valve 704, seem 706, eyelet 708, belt loop 710, Velcro strip 712.

Inflatable pad 700 has at least two sheets of pad material 702 operably coupled to form an air bladder. Pad material 702 can be made of plastic or other suitable material. Inflatable pad 700 has seem 706 circumscribing its exterior, thereby creating an airtight seal between the at least two sheets of pad material 702. Seem 706 can be made by electro-weld, adhesive, or other suitable method. A plurality of seems 706 exist within the interior of inflatable pad 700, thereby creating air channels. Inflating valve 704 is disposed within one of the at least two sheets of pad material 702, and is adapted to provide airflow in and out of inflatable pad 700. Inflating valve 704 can have a screwing mechanism, a corking mechanism, or other suitable mechanism to allow and restrict airflow in inflatable pad 700.

Belt loop 710 is coupled to one side of pad material 702 to provide a guide for a strap (not shown). Belt loop 710 can be made of plastic or other suitable material and coupled to pad material 702 with electro-weld, adhesive, or other suitable method. Velcro strip 712 runs down the length of both sides of inflatable pad 700 to provide a method of securing other pads (not shown) to inflatable pad 700. Alternatively, quick-release fasteners, snaps, zippers, and other suitable fastening methods can be employed. Eyelet 708 provides alternative securing methods to secure inflatable pad 700 to an object.

In operation, inflatable pad 700 is stored in a deflated state with inflating valve 704 in a closed state. When inflating valve 704 is opened, inflatable pad 700 can be inflated manually or with an air compressor or air pumping motor (not shown), causing inflatable pad 700 to expand. In some embodiments, the pad material 702 can be provided with a pop-off valve or the like to prevent over-inflation that would otherwise rupture the pad material 702. Once inflatable pad 700 has expanded to its maximum thickness, inflating valve 704 can be closed to retain the air. To deflate inflatable pad 700, inflating valve 704 is opened and the air is expelled. Alternatively, inflatable pad 700 can be rolled, thereby expelling the air through inflating valve 704 and collapsing inflatable pad 700.

Still further embodiments of the presently disclosed pad can include pads having both self-inflating and inflatable portions. For example, some embodiments can have a plurality of sealable chambers, where at least one sealable chamber is self-inflating, and at least one sealable chamber is inflatable. Other embodiments can include a sealed chamber that is at least partially self-inflating to a first internal volume and further inflatable to a second internal volume that is greater than the first internal volume. Any of the presently disclosed pads can be used with DMS 100 in any of the locations, configurations, and embodiments disclosed herein.

Figure 8:
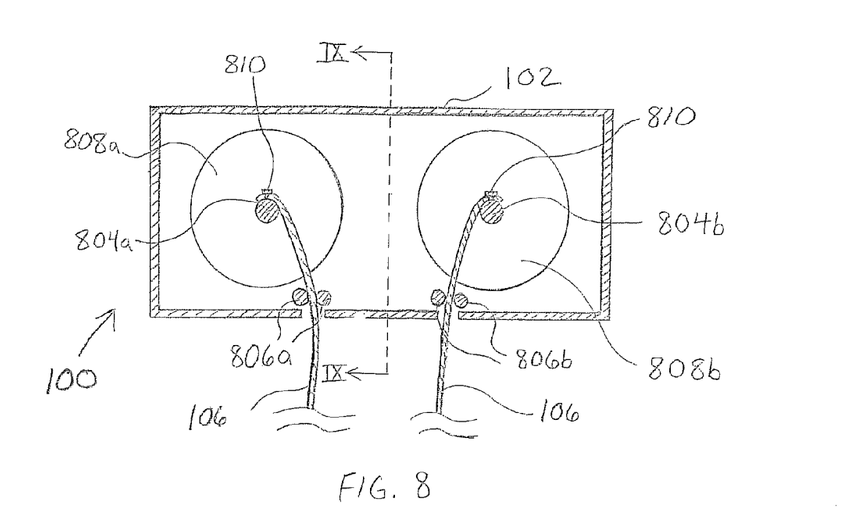
FIG. 8 is a cross-sectional view of the retractable damage mitigation system of FIG. 1.

Referring now also to FIG. 8 in the drawings, there is shown a cross-sectional view of the retractable DMS 100. DMS 100 includes housing 102, tab material 106, first spindle rod 804a, first pinching rods 806a, first spindle end 808a, second spindle rod 804b, second pinching rods 806b, second spindle end 808b, and fasteners 810. It will be appreciated that the tab material 106 is attached to, or representative of, an edge of a pad, which can be any pad described herein including those described above in connection with FIGS. 6 and 7.

Tab material 106 is coupled to both first spindle rod 804a and second spindle rod 804b with a plurality of fasteners 810, such as tacks, nails, or screws. Alternatively, tab material 106 can be glued, screwed, or coupled by other suitable methods to both first spindle rod 804a and second spindle rod 804b. First spindle end 808a provides a guide for the winding of tab material 106 and a first pad (not shown) around first spindle rod 804a, while second spindle end 808b provides a guide for the winding of tab material 106 and a second pad (not shown) about second spindle rod 804b. First pinching rods 806a are disposed about tab material 106 and pinch tab material 106 and, eventually, the first pad as they are wound about first spindle rod 804a, thereby deflating the first pad as it rolls between first pinching rods 806a. Second pinching rods 806b are disposed about tab material 106 and pinch tab material 106 and, eventually, the second pad as they are wound about second spindle rod 804b, thereby deflating the second pad as it rolls between second pinching rods 806b. Alternatively, both the first pad and the second pad can be wound about a single spindle, or more than two pads can be wound about more than two spindles.

In some embodiments, the pinching rods 806a, 806b can be configured to freely rotate (about a longitudinal axis that extends in and out of the page as viewed in FIG. 8) as the tab material 106 and pad pass therebetween. In alternative embodiments, the pinching rods 806a, 806b can be fixed so as not to rotate.

Figure 9:
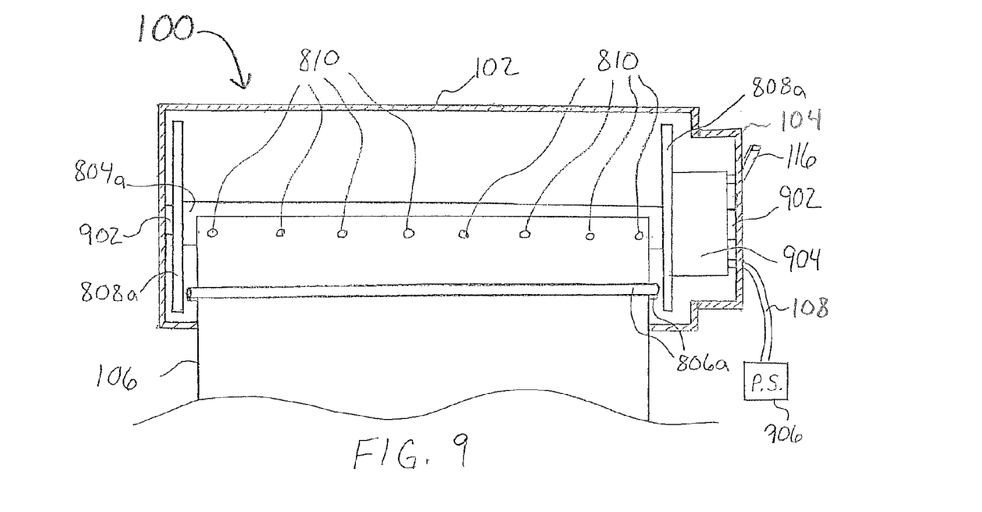
FIG. 9 is a cross-sectional view of the retractable damage mitigation system of FIG. 1 taken at line IX-IX of FIG. 8.

Referring now also to FIG. 9 in the drawings, there is shown a cross-sectional view of the retractable DMS 100 taken at line IX-IX of FIG. 8. DMS 100 includes housing 102, motor housing 104, tab material 106, cable 108, switch 116, first spindle rod 804a, first pinching rods 806a, first spindle end 808a, retaining pivot 902, motor 904, and power supply 906.

Tab material 106 is coupled to first spindle rod 804a with a plurality of fasteners 810. Alternatively, tab material 106 can be glued, screwed, or coupled by other suitable methods to first spindle rod 804a. A first spindle having two opposing first spindle ends 808a and first spindle rod 804a, winds tab material 106 and a pad (not shown) around first spindle rod 804a. Motor 904 is operably coupled and adapted to rotate the first spindle within housing 102 for winding tab material 106 and attached pad about first spindle rod 804a. Motor 904 is controlled by switch 116. Switch 116 can operate motor 116 by turning it on, turning it off, and/or selecting rotation speed and/or rotation direction. It will be appreciated that switch 116 is representative of operation controls, which can be implemented in any number of ways including one or more switches, knobs, touch pads, buttons, or other types of controls. Cable 108 is adapted to propagate a signal to motor 904. Cable 108 can propagate a power signal or a control signal. Power supply 906 can be adapted to provide AC power or DC power to the motor according to the power requirements of the motor. Power supply 906 can be any desired electrical power source, for example a car battery, an AC power outlet, or a battery pack.

A first retaining pivot 902 is disposed between housing 102 and first spindle end 808a, a second retaining pivot 902 is disposed between motor housing 104 and motor 904, thereby suspending the first spindle within housing 102. First pinching rods 806a are disposed about tab material 106 and pinch tab material 106 and, eventually, the pad as they are wound about first spindle rod 804a, thereby deflating the pad as it rolls between first pinching rods 806a.

Figure 10:
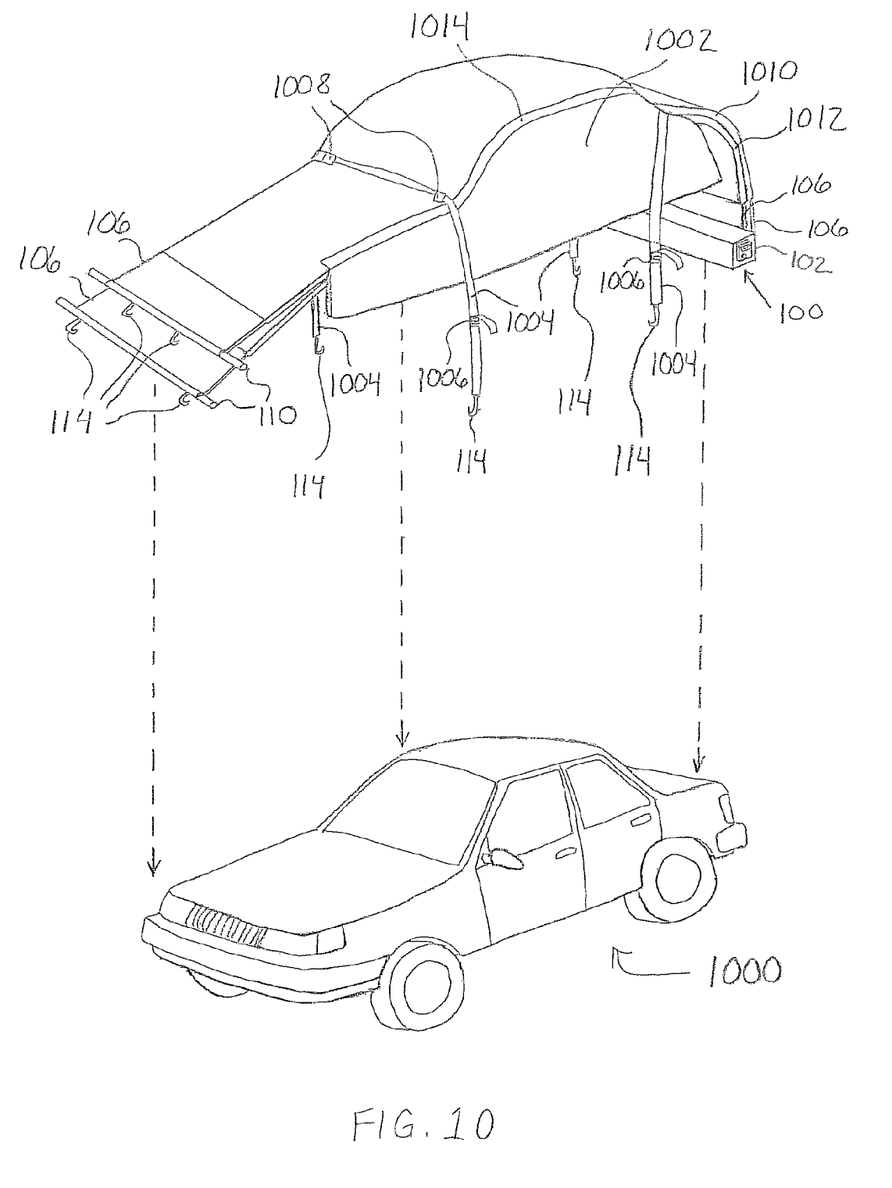
FIG. 10 is an exploded perspective view of a deployed retractable damage mitigation system and a vehicle.

Referring now also to FIG. 10 in the drawings, there is shown an exploded perspective view of a deployed retractable DMS 100 and a vehicle 1000 according to the present application. DMS 100 includes housing 102, tab material 106, bar 110, hook 114, opposing side pads 1002, strap 1004, buckle 1006, belt loop 1008, first pad 1012, second pad 1010, and tab

1014. Any of the pads described herein can be used as first pad 1012, second pad 1010, and side pads 1002.

In a deployed state, DMS 100 is disposed proximate a bumper of vehicle 1000. First pad 1012 is pulled from housing 102 over vehicle 1000 and secured to a front bumper of vehicle 1000 with one or more hook 114. Second pad 1010 is pulled from housing 102 over vehicle 1000 and over first pad 1012, and secured to a front bumper of vehicle 1000 with one or more hook 114. Alternatively, second pad 1010 can be secured to bar 110 of first pad 1012 or first pad 1012 with one or more of hook 114, or other suitable methods. Side pads 1002 are coupled to respective edges of first pad 1012 or second pad 1010 via tab 1014. Side pads 1002 can be coupled to the first and/or second pads 1012, 1010 with Velcro, snaps, quick-release connectors, or other suitable methods. In some embodiments, the side pads 1002 can include an inflatable or self-inflating, internal sealed chamber that is in fluid communication with an internal chamber of one or both of the first and second pads 1012, 1010, such that the side chambers can be inflated with air from the first and/or second pads 1012, 1010. For example, in some such embodiments, one or both of the side pads 1002 can be connected to the first and/or second pads 1012, 1010 via air couplings that provide for fluid communication therebetween. Side pads 1002 can have a flap (not shown) for allowing a side view mirror of vehicle 1000 to protrude through. One or more of straps 104 can be pulled through one or more of belt loops 1008 to conform both first pad 1012 and second pad 1010 to the contours of vehicle 1000. Strap 104 can be secured to vehicle 1000 with one or more of hooks 114 and tightened with buckle 1006.

Alternatively, one pad could be deployed to allow multiple levels of protection against impact damage. Although described in a generic form for all vehicles, DMS 100 can be custom-made for specific vehicle makes, models, and types. Examples of vehicle types include sedans, trucks, vans, and sport utility vehicles.

Figure 11:
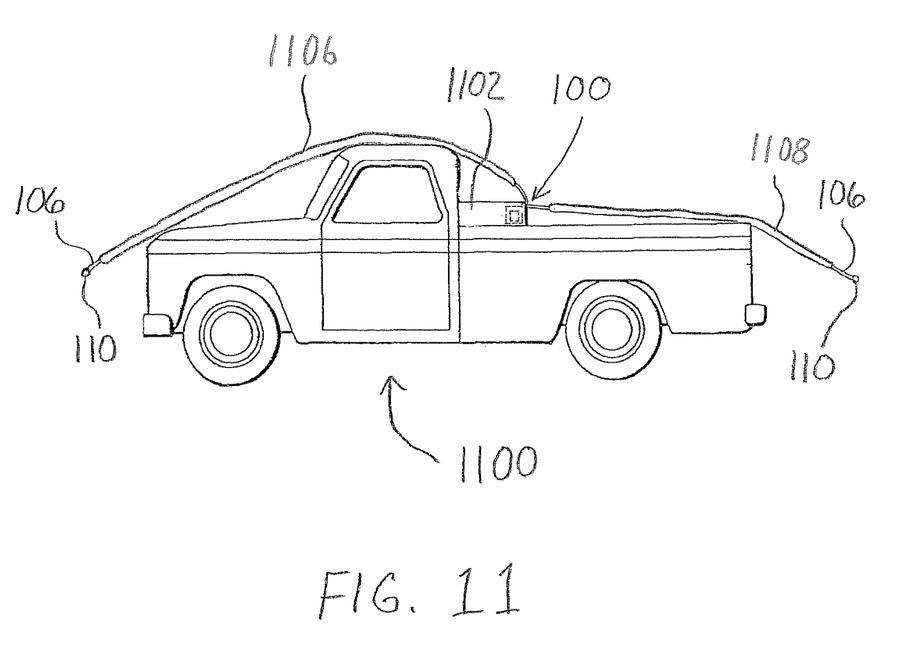
FIG. 11 is a side view of the retractable damage mitigation system deployed from a utility box disposed within a truck.

Referring now also to FIG. 11 in the drawings, there is shown a side view of the retractable DMS 100 deployed from a utility box 1102 disposed within a truck 1100 according to the present application. DMS 100 can be disposed within utility box 1102 disposed within a truck 1100 to allow easy access and deployment. At least one pad 1106 can be deployed and pulled over the front of truck 1100 to mitigate impact damage to truck 1100. The pad 1106 can be deployed so that tab material 106 lies between a door of utility box 1102 and the edge of utility box 1102. A notch can be cut in tab material 106 so that the utility box latching mechanism can operate properly. At least one hook 114 can secure the pad 1012 to truck 1100 by hooking hook 114 to the bottom of the front bumper of truck 1100. Alternatively, the pad 1106 can be a first pad 1106 that is operable to be pulled through the opening between the back of the door of utility box 1102 and the back edge of utility box 1102, over the front of truck 1100, and secured to the bottom of the front bumper of truck 1100. A second pad 1108 can be pulled through the opening between the back of the door of utility box 1102 and the back edge of utility box 1102, over the bed of truck 1100, and secured to the bottom of the rear bumper of truck 1100. DMS 100 can be factory installed or retro-fitted to existing utility boxes. Any of the pads described herein can be used as first pad 1106 and second pad 1108.

Figure 12:
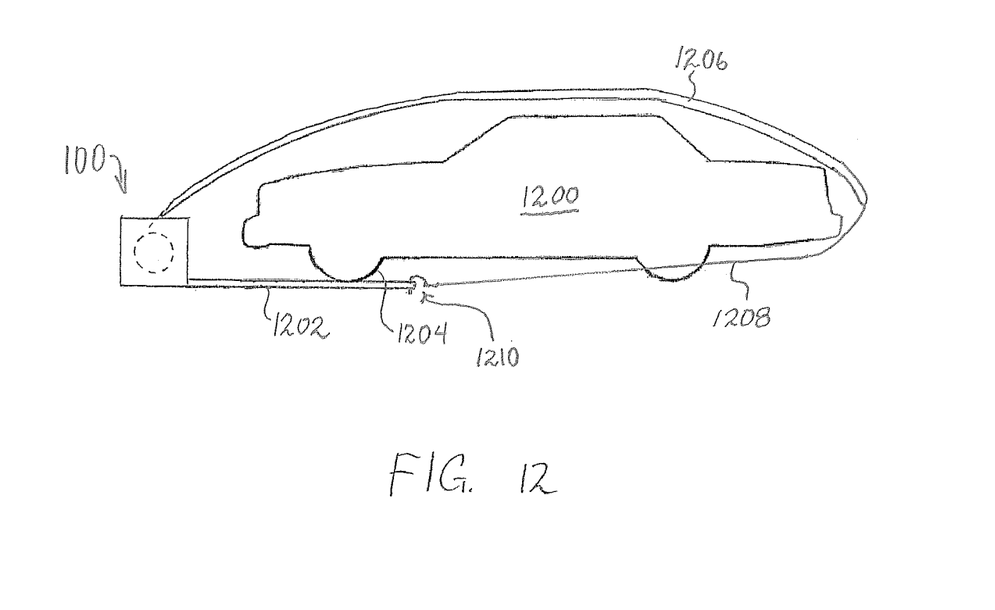
FIG. 12 is a side view of the retractable damage mitigation system deployed from a location adjacent to a vehicle and held in place by the vehicle.

Referring now also to FIG. 12 in the drawings, there is shown a side view of an embodiment of the retractable DMS 100 positioned in front of a vehicle 1200. DMS 100 can be provided with, or attached to, an anchor member 1202, which can include, for example, one or more arms or plates. The anchor member 1202 is held in place by at least a portion of the weight of the vehicle 1200, thereby allowing the anchor member 1202 to, in turn, hold the DMS 100 in place. Thus, embodiments of the anchor member 1202 can include any apparatus suitable for extending between at least one wheel 1204 and the ground and holding the DMS 100 at least substantially in place.

In FIG. 12, the DMS 100 is positioned in front of the vehicle 1200. Alternatively, the DMS 100 can be positioned to the rear of the vehicle 1200. At least one front wheel 1204 is positioned over the anchor member 1202, thereby holding the anchor member 1202 in place between the vehicle 1200 and the ground. This arrangement can be accomplished, for example, by positioning the anchor member 1202 on the ground, and then driving the vehicle 1200 to a position where at least one wheel 1204 is positioned over the anchor member 1202. Alternatively, front wheels, one or both back wheels, or all of the wheels could be positioned over the anchor member 1202 depending on the location of the DMS 100 relative to the vehicle 1200 and the size of the anchor member 1202.

In FIG. 12, the DMS 100 is shown in a deployed state, wherein a pad 1206 is at least partially covering the vehicle 1200. The pad 1206 can be a self-inflating foam pad as shown in FIG. 6, an inflatable pad as shown in FIG. 7, other suitable material, or any combination thereof. In some embodiments, the pad 1206 can include side panels such as shown in FIG. 10. The pad 1206 extends between the front and rear of the vehicle 1200. One or more tie-down straps 1208 extend from the distal end of the pad 1206 to the anchor member 1202. In some embodiments, the tie-down straps 1208 can be elastic and/or length-wise adjustable. The tie-down straps 1208 are secured to the anchor member 1202, for example using a hook 1210 or the like. Additional straps or other securing means can be provided for further securing the pad 1206 in place relative to the vehicle 1200.

It will be apparent to those skilled in the art that an invention with significant advantages has been described and illustrated. Although the present application is shown in a limited number of forms, it is not limited to just these forms, but is amenable to various changes and modifications without departing from the spirit thereof.

What is claimed is:

1. A damage mitigation system for a vehicle, the system comprising:
   a housing coupled to a vehicle;
   a spindle disposed within the housing;
   a first self-inflating foam pad configured to be wound about the spindle;
   first and second pinching rods rotatably supported by the housing and configured to pinch the first self-inflating foam pad as the first self-inflating foam pad moves between the first and second pinching rods;
   a motor adapted to retract the first self-inflating foam pad by winding the first self-inflating foam pad about the spindle; and
   a first valve operably associated with the first self-inflating foam pad, wherein the first valve is operable to be opened for allowing the first self-inflating foam pad to inflate and for deflating the first self-inflating foam pad while the first self-inflating foam pad moves between the first and second pinching rods;
   wherein the first pinching rod rotates in a counterclockwise rotational direction, while the second pinching rod rotates in the clockwise rotational direction as the first self-inflating foam pad is extracted from the housing; and
   wherein the first pinching rod rotates in a clockwise rotational direction, while the second pinching rod rotates in a counterclockwise rotational direction as the first self-inflating foam pad is retracted within the housing.

2. The damage mitigation system according to claim 1, further comprising:

a second self-inflating foam pad; and a second valve operably associated with the second self-inflating foam pad, wherein both the first and second self-inflating foam pads are arranged to be wound about the spindle when the first and second self-inflating foam pads are retracted within the housing.

3. The damage mitigation system according to claim 1, further comprising:

a second self-inflating foam pad;

a second valve operably associated with the second self-inflating foam pad; and a second spindle disposed within the housing, wherein the second self-inflating foam pad is arranged to be wound about the second spindle when the second self-inflating foam pad is retracted within the housing.

4. The damage mitigation system according to claim 1, further comprising a second self-inflating foam pad.

\* \* \* \* \*